(12) United States Patent
Zenitani et al.

(10) Patent No.: US 11,345,407 B2
(45) Date of Patent: May 31, 2022

(54) UPPER VEHICLE-BODY STRUCTURE

(71) Applicant: Mazda Motor Corporation, Hiroshima (JP)

(72) Inventors: Tsuneaki Zenitani, Hiroshima (JP); Shuji Muraoka, Hiroshima (JP); Yusuke Desaki, Hiroshima (JP); Arata Osako, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 204 days.

(21) Appl. No.: 16/810,839

(22) Filed: Mar. 6, 2020

(65) Prior Publication Data

US 2020/0385063 A1 Dec. 10, 2020

(30) Foreign Application Priority Data

Jun. 5, 2019 (JP) .............................. JP2019-105576

(51) Int. Cl.
  *B62D 25/04* (2006.01)
  *B62D 27/02* (2006.01)
  *B62D 21/04* (2006.01)

(52) U.S. Cl.
  CPC ........... *B62D 25/04* (2013.01); *B62D 27/023* (2013.01); *B62D 21/04* (2013.01)

(58) Field of Classification Search
  CPC .............................. B62D 25/04; B62D 27/203
  USPC ........................................ 296/193.06, 29, 30
  See application file for complete search history.

(56) References Cited

U.S. PATENT DOCUMENTS 8,382,195 B2 * 2/2013 Iwase .................. B62D 25/025
                                                296/187.12

FOREIGN PATENT DOCUMENTS

| JP | H01125278 U | * | 8/1989 | | |
| JP | 2015-071357 A | | 4/2015 | | |
| KR | 950014415 B1 | * | 11/1995 | ........... | B62D 25/025 |
| WO | WO-2014129056 A1 | * | 8/2014 | ............. | B62D 25/04 |

* cited by examiner

*Primary Examiner* — Dennis H Pedder
(74) *Attorney, Agent, or Firm* — Xsensus LLP

(57) ABSTRACT

The present disclosure relates to an upper vehicle-body structure that suppresses bending deformation of a front pillar portion with respect to a hinge pillar portion by suppressing the crushing of a closed cross-section portion when external force is applied to the front pillar portion in the direction of bending the front pillar portion in the bending direction thereof.

17 Claims, 6 Drawing Sheets

UPPER VEHICLE-BODY STRUCTURE

CROSS-REFERENCE TO RELATED APPLICATIONS

The present application claims priority to JP 2019-105576, filed Jun. 5, 2019, the entire contents of which are incorporated herein by reference.

TECHNICAL FIELD

The present disclosure relates to an upper vehicle-body structure including front pillar portions each having a closed cross-section structure, the front pillar portions being located on both of left and right sides of a front windshield in the vehicle width direction and hinge pillar portions each having a closed cross-section structure, the hinge pillar portions extending downward from front end portions of the front pillar portions to support door hinge members.

BACKGROUND

Hitherto, front pillar portions each having a closed cross-section structure and located on both of left and right sides of a front windshield (so-called front window glass) in the vehicle width direction have generally been provided so as to extend diagonally rearward from upper end portions of hinge pillar portions that extend in the up-down direction and so as to support the front windshield and define door opening portions.

Pillar portion structures of the front pillar portions and the hinge pillar portions as above need to be reinforced in preparation for cases where load is applied from a place above the vehicle or the vehicle rolls over by any chance due to bent portions generally being included in coupling sections of the front pillar portions and the hinge pillar portions.

For the purpose as above, Japanese Patent Laid-Open No. 2015-71357 discloses a related-art structure that reinforces the pillar rigidity by providing a hollow closed section member in the front pillar portion in a region including the front pillar portion, specifically, from a roof side rail to the inside of the front pillar portion.

The hollow closed section member having the related-art structure disclosed in Japanese Patent Laid-Open No. 2015-71357 is formed to have a triangular cross section having an outer wall located on the outer side in the curved direction and a first inner wall and a second inner wall located on the inner side in the curved direction. Although the hollow closed section member has an advantage in that the pillar rigidity can be reinforced, the weight of the hollow closed section member increases.

In recent years, from the viewpoint of improving fuel efficiency and improving the motion performance of the vehicle, weight saving of the vehicle body is desired, and there is a demand for realizing the reinforcement of the vehicle body with a lighter-weight configuration.

In particular, when the front pillar portion is formed to be thin in accordance with the purpose of improving visibility (improving frontal vision) and demands regarding the vehicle design, the cross-sectional shape suddenly changes at the portion that changes to the front pillar portion from the hinge pillar portion. When load is applied, breakage easily occurs at the section in concern, and hence there has been room for improvement.

SUMMARY

Therefore, an aspect of the present disclosure is to provide an upper vehicle-body structure capable of suppressing the bending deformation of the front pillar portion with respect to the hinge pillar portion by suppressing the crushing of the closed cross-section portion when external force is applied to the front pillar portion in the direction of bending the front pillar portion in the bending direction thereof.

The present disclosure is directed to an upper vehicle-body structure, including: front pillar portions each having a closed cross-section structure, the front pillar portions being located on both of left and right sides of a front windshield in a vehicle width direction; and hinge pillar portions each having a closed cross-section structure, the hinge pillar portions extending downward from front end portions of the front pillar portions to support door hinge members. In the upper vehicle-body structure, an area of a cross section orthogonal to a longitudinal direction of each of the front pillar portions is smaller than an area of a cross section orthogonal to a longitudinal direction of each of the hinge pillar portions, and a reinforcement portion that suppresses crushing of a closed cross-section portion formed by the front pillar portion and the hinge pillar portion is provided so as to cover a position at which a curvature of an edge on a door opening portion side in a cross section orthogonal to a longitudinal direction of a bent portion between the front pillar portion and the hinge pillar portion is maximum.

With this configuration, the reinforcement portion that suppresses the crushing of the closed cross-section portion between the front pillar portion and the hinge pillar portion is provided so as to cover the position at which the curvature is the maximum (that is, the position at which the radius of curvature is the smallest and which becomes the starting point of the bending deformation). Therefore, when external force is applied to the front pillar portion in a direction of bending the front pillar portion in the bending direction thereof, the crushing of the closed cross-section portion can be suppressed by the reinforcement portion and the bending deformation of the front pillar portion with respect to the hinge pillar portion can be suppressed. By locally reinforcing the position that becomes the starting point of the bending deformation, the suppression of the bending deformation can be realized with a lightweight configuration.

The area of the cross section orthogonal to the longitudinal direction of the front pillar portion is smaller than the area of the cross section orthogonal to the longitudinal direction of the hinge pillar portion, and hence visibility can be improved (frontal vision can be improved) and the vehicle design properties can be improved.

In an aspect of the present disclosure, the reinforcement portion is a plate-like member, and the plate-like member has a bead portion formed substantially orthogonal to a longitudinal direction of the closed cross-section portion in which the plate-like member is provided.

With this configuration, by forming the bead portion, the proof stress in the plate-like member (reinforcement portion) in the direction substantially orthogonal to the longitudinal direction of the closed cross-section portion is reinforced, and hence the crushing of the closed cross-section portion can be further suppressed and the bending deformation of the front pillar portion can be suppressed even more.

In an aspect of the present disclosure, the reinforcement portion is a plate-like member, and the plate-like member has a flange portion formed substantially orthogonal to a longitudinal direction of the closed cross-section portion in which the plate-like member is provided.

With this configuration, by forming the flange portion, the proof stress in the plate-like member (reinforcement portion) in the direction substantially orthogonal to the longitudinal direction of the closed cross-section portion is reinforced, and hence the crushing of the closed cross-section portion can be further suppressed and the bending deformation of the front pillar portion can be suppressed even more.

In an aspect of the present disclosure, the reinforcement portion is a plate-like member, and the plate-like member has a flange portion formed along a longitudinal direction of the closed cross-section portion in which the plate-like member is provided.

With this configuration, by forming the flange portion, the proof stress in the plate-like member (reinforcement portion) in the direction along the longitudinal direction of the closed cross-section portion is reinforced, and hence the crushing of the closed cross-section portion can be further suppressed and the bending deformation of the front pillar portion can be suppressed even more.

According to the present disclosure, an advantageous effect of enabling the bending deformation of the front pillar portion with respect to the hinge pillar portion to be suppressed by suppressing the crushing of the closed cross-section portion when external force is applied to the front pillar portion in the direction of bending the front pillar portion in the bending direction thereof is provided.

DETAILED DESCRIPTION

An object of suppressing the bending deformation of a front pillar portion with respect to a hinge pillar portion by suppressing the crushing of a closed cross-section portion when external force is applied to the front pillar portion in the direction of bending the front pillar portion in the bending direction thereof has been attained by a configuration of an upper vehicle-body structure, including: front pillar portions each having a closed cross-section structure, the front pillar portions being located on both of left and right sides of a front windshield in a vehicle width direction; and hinge pillar portions each having a closed cross-section structure, the hinge pillar portions extending downward from front end portions of the front pillar portions to support door hinge members. In the upper vehicle-body structure, an area of a cross section orthogonal to a longitudinal direction of each of the front pillar portions is smaller than an area of a cross section orthogonal to a longitudinal direction of each of the hinge pillar portions, and a reinforcement portion that suppresses crushing of a closed cross-section portion formed by the front pillar portion and the hinge pillar portion is provided so as to cover a position at which a curvature of an edge on a door opening portion side in a cross section orthogonal to a longitudinal direction of a bent portion between the front pillar portion and the hinge pillar portion is maximum.

An aspect of the present disclosure is described in detail below with reference to the accompanying drawings.

Figure 1:
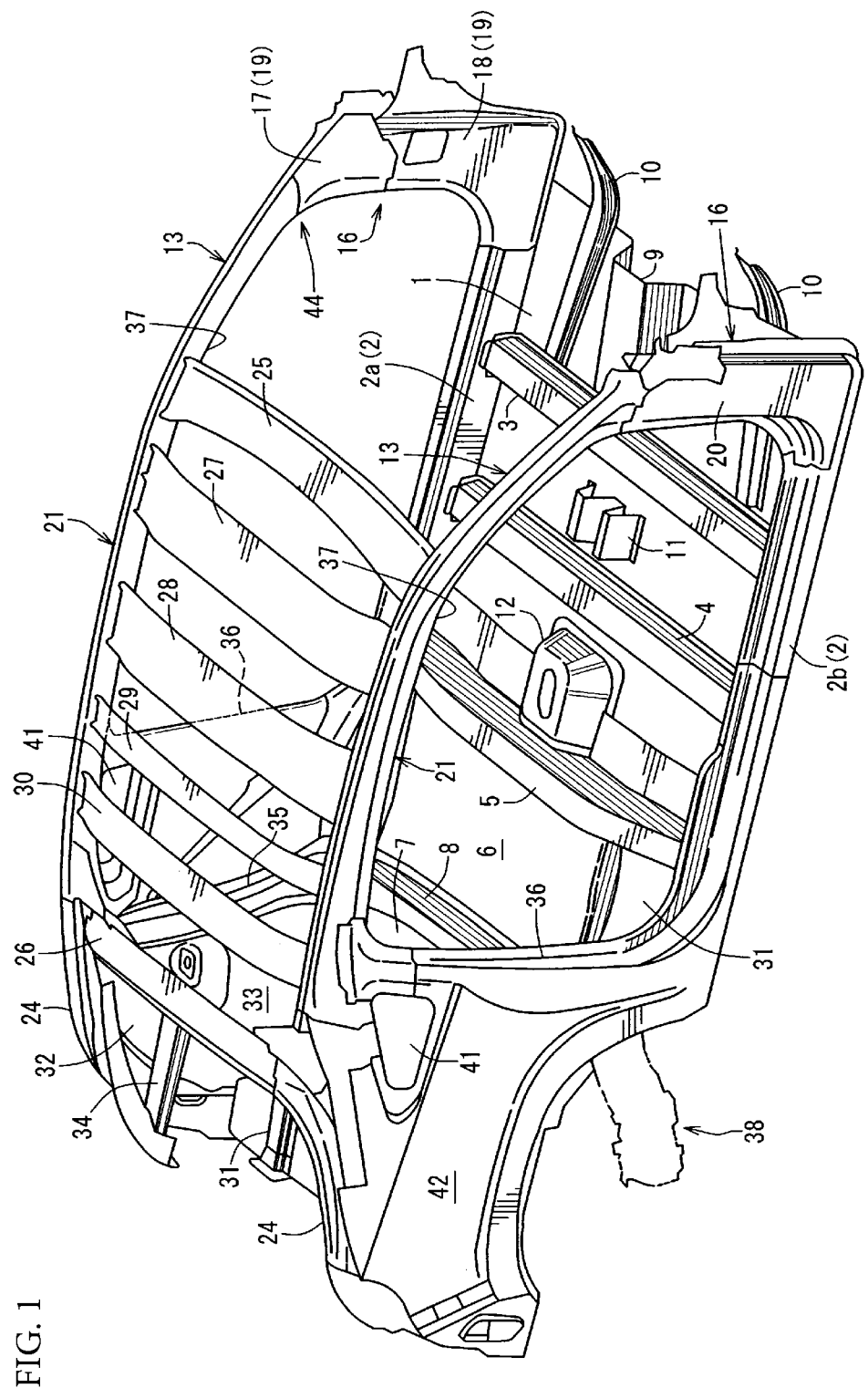
FIG. 1 is a perspective view illustrating a vehicle-body structure of an entire vehicle including an upper vehicle-body structure according to one or more aspects of the present disclosure.
Figure 2:
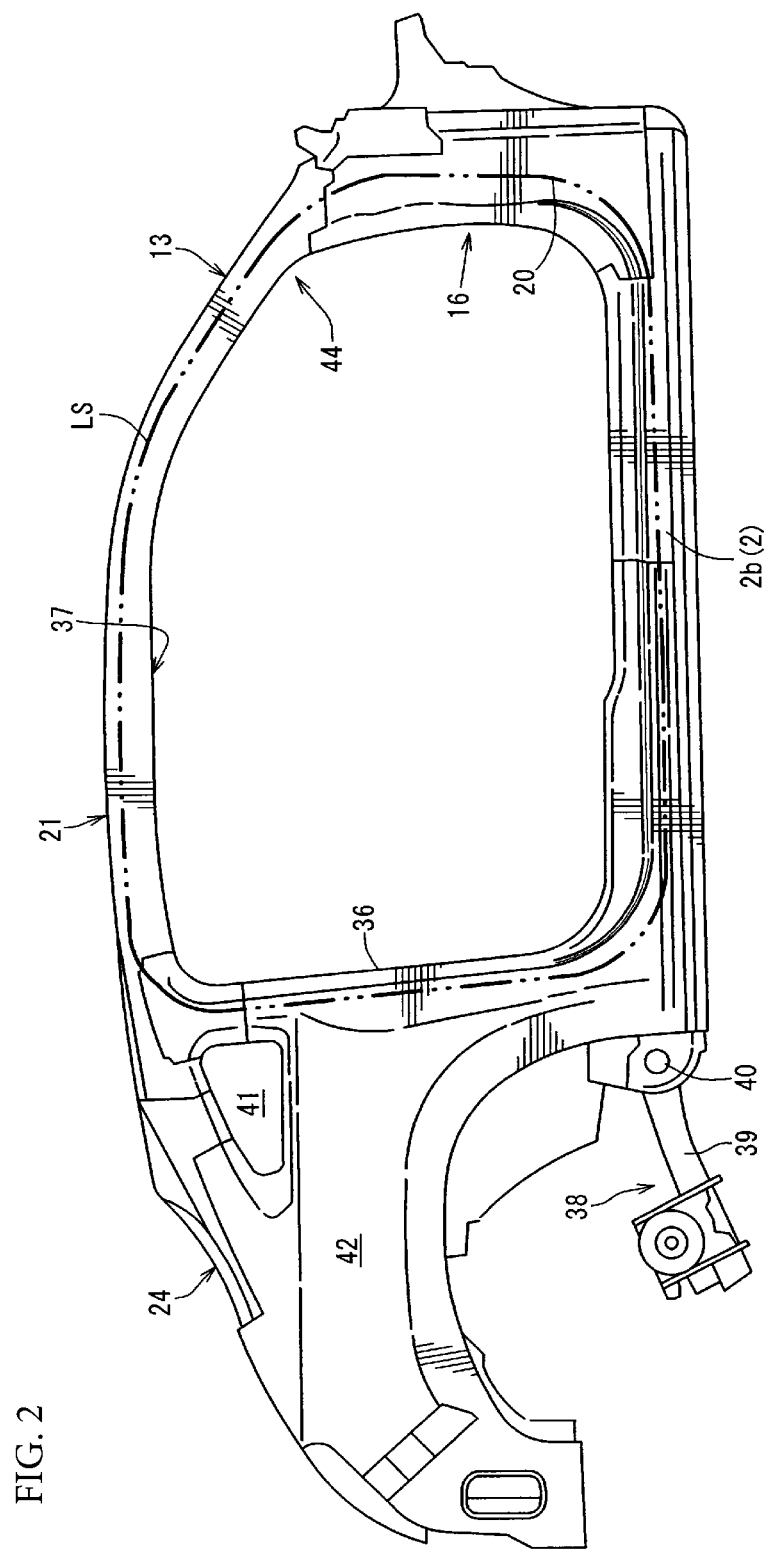
FIG. 2 is a side view of the right side of the vehicle in FIG. 1.
Figure 3:
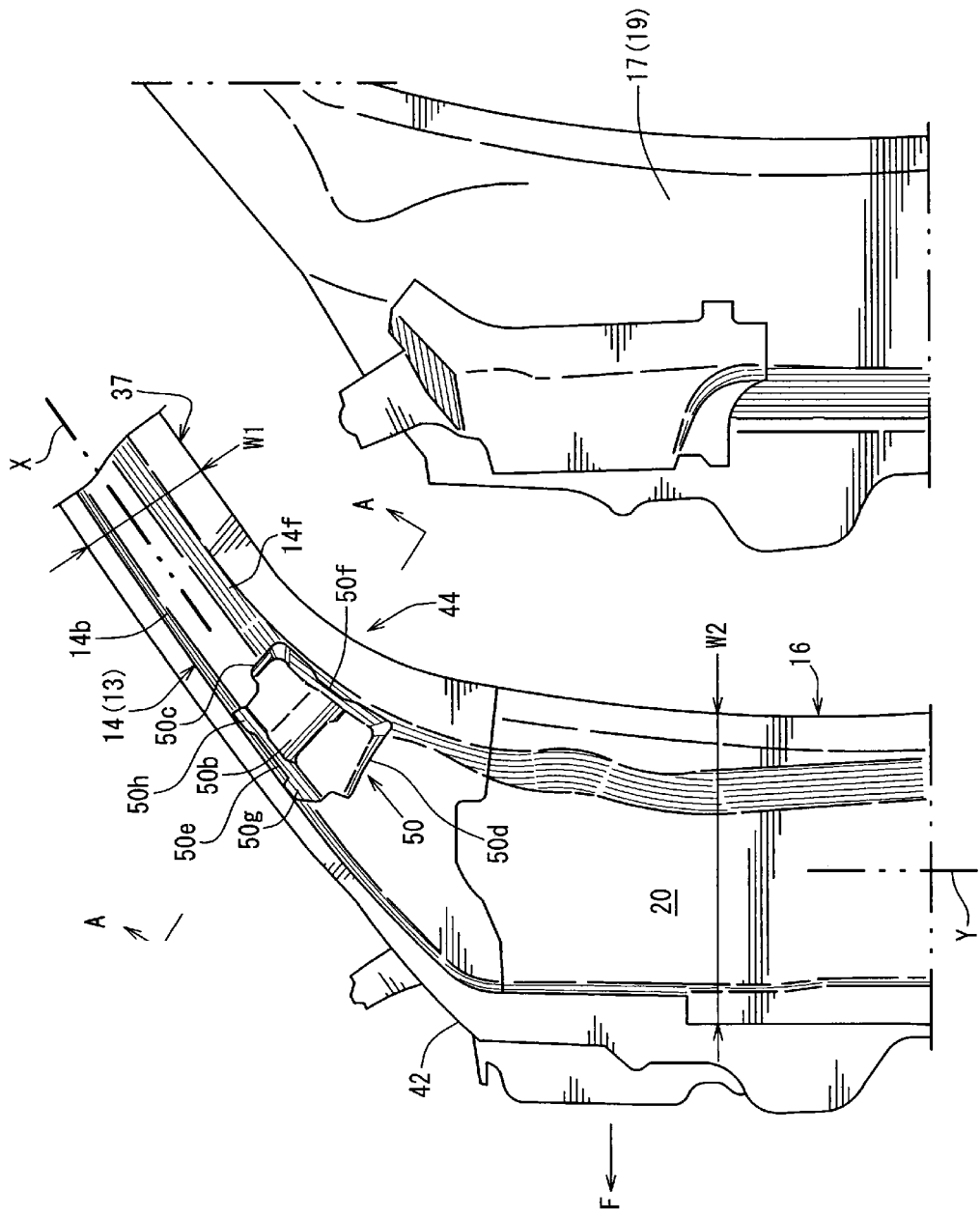
FIG. 3 is an exploded side view illustrating a state in which the upper vehicle-body structure is disassembled into a front pillar outer portion, a hinge pillar outer portion, and a hinge pillar upper-inner portion and seen from the inner side in the vehicle width direction.
Figure 4:
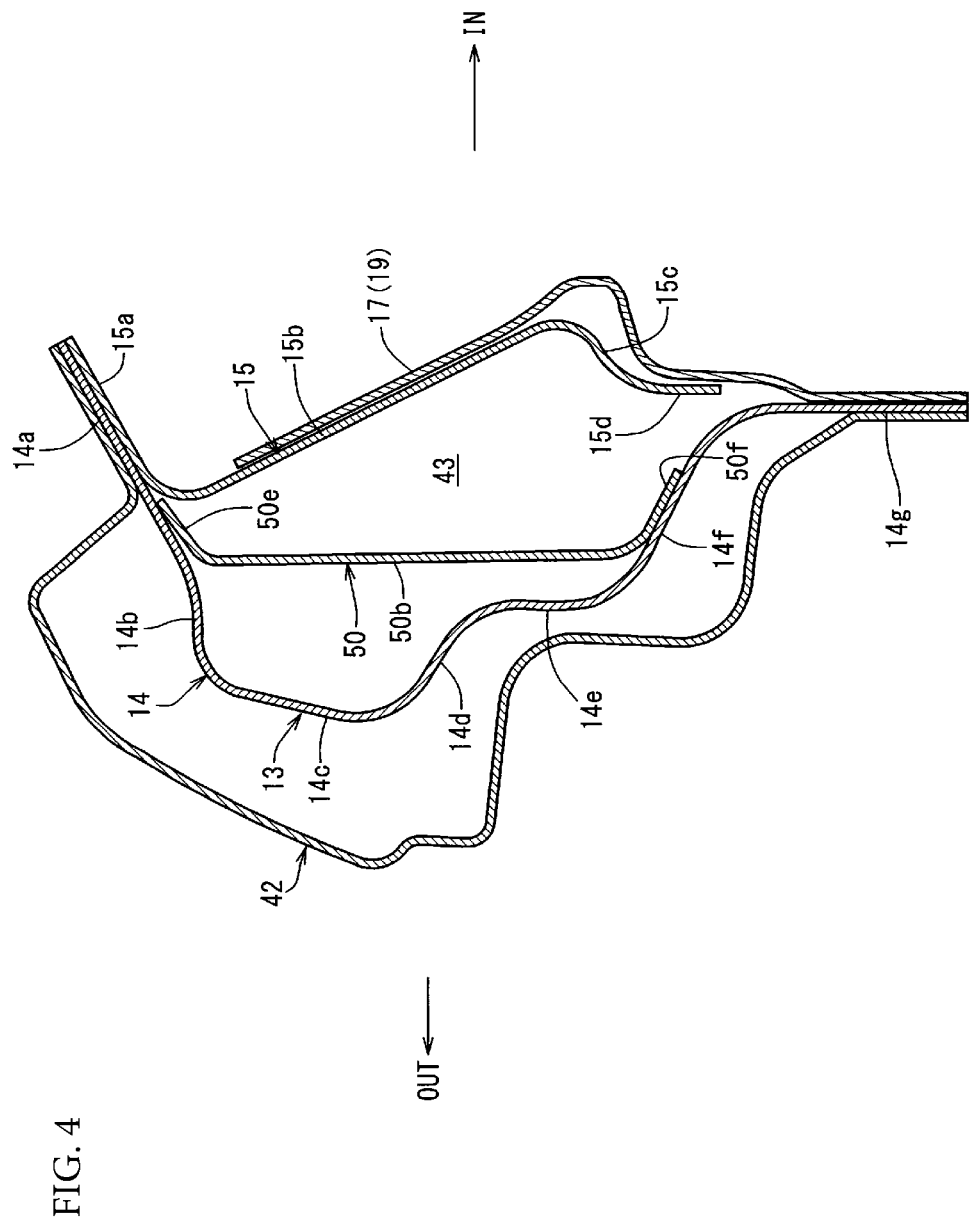
FIG. 4 is a cross-sectional view taken along line A-A from arrows in FIG. 3.
Figure 5:
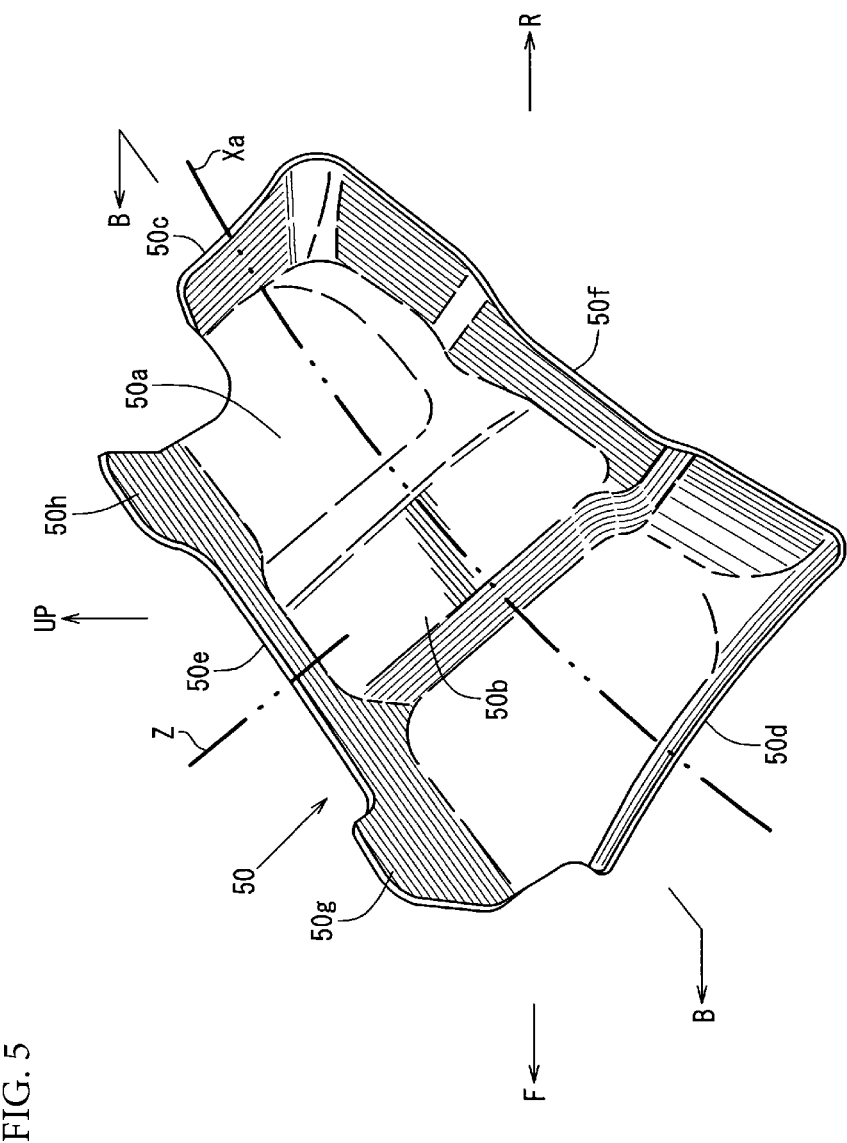
FIG. 5 is a perspective view of a reinforcement portion.
Figure 6:
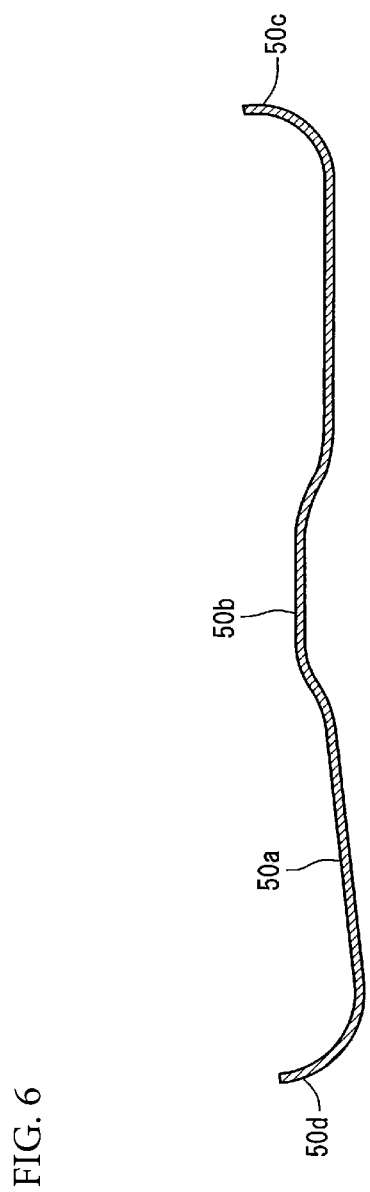
FIG. 6 is a cross-sectional view taken along line B-B from arrows in FIG. 5.

The drawings illustrate the upper vehicle-body structure. FIG. 1 is a perspective view illustrating a vehicle-body structure of an entire vehicle including the upper vehicle-body structure. FIG. 2 is a side view of the right side of the vehicle in FIG. 1. FIG. 3 is an exploded side view illustrating a state in which the upper vehicle-body structure is disassembled into a front pillar outer portion, a hinge pillar outer portion, and a hinge pillar upper-inner portion and seen from the inner side in the vehicle width direction. FIG. 4 is a cross-sectional view taken along line A-A from arrows in FIG. 3. FIG. 5 is a perspective view of a reinforcement portion. FIG. 6 is a cross-sectional view taken along line B-B from arrows in FIG. 5.

Note that a vehicle-body structure of an electric automobile that does not include an internal-combustion engine for vehicle traveling, an exhaust pipe, and a center tunnel portion that extends so as to be long in the vehicle front-rear direction is exemplified in the embodiment below, but the present disclosure is not only limited to the vehicle-body structure of the electric automobile.

First, the vehicle-body structure of the entire vehicle is described with reference to FIG. 1 and FIG. 2.

As illustrated in FIG. 1, a dash panel (in detail, a dash lower panel) that separates a motor room of the vehicle front portion and a vehicle interior behind the motor room in the vehicle front-rear direction is provided, and a floor panel 1 having a substantially flat shape is disposed on a lower rear-end portion of the dash panel in a continuous manner.

The floor panel 1 forms a floor surface of the vehicle interior, and side sills 2 each having a closed cross-section structure that extend in the vehicle front-rear direction are provided on both of left and right sides of the floor panel 1 in the vehicle width direction. The side sills 2 are vehicle body strength members each having a side sill closed cross-section portion extending in the vehicle front-rear direction obtained by fixing a side sill inner portion 2a and a side sill outer portion 2b to each other by joining.

A front-portion cross member 3 (so-called No. 2 cross member) that linearly couples front portions of the pair of left and right side sills 2, 2 to each other in the vehicle width direction is provided. The front-portion cross member 3 is formed by a member having a hat-shaped cross section, and a closed cross-section portion linearly extending in the vehicle width direction is formed between the floor panel 1 and the front-portion cross member 3 by joining the lower flange of the member to the floor panel 1.

On the rear side of the front-portion cross member 3, an intermediate cross member 4 (so-called No. 2.5 cross member) that linearly couples intermediate portions of the pair of left and right side sills 2 in the front-rear direction to each other in the vehicle width direction is provided. The intermediate cross member 4 is also formed by a member having a hat-shaped cross section, and a closed cross-section portion linearly extending in the vehicle width direction is formed between the floor panel 1 and the intermediate cross member 4 by joining a lower flange of the member to the floor panel 1.

The intermediate cross member 4 and the front-portion cross member 3 are parallelly disposed.

On the rear side of the intermediate cross member 4, a kick-up portion 5 that rises upward and then extends rearward from an upper end thereof is formed. On a lower-side portion of the kick-up portion 5, a cross member (so-called No. 3 cross member) extending in the vehicle width direction is provided. A closed cross-section portion extending in the vehicle width direction is formed between the cross member and the kick-up portion 5.

A rear seat pan 6 for mounting the rear seat is provided on the rear side of the kick-up portion 5. Further, a rear floor pan 7 that forms a floor surface of a trunk is disposed on the rear side of the rear seat pan 6 in a continuous manner.

A rear cross member 8 (so-called No. 4 cross member) that extends in the vehicle width direction across a rear end portion of the rear seat pan 6 and a front end portion of the rear floor pan 7 is provided, and a closed cross-section portion extending in the vehicle width direction is formed between the rear cross member 8 and each of the rear seat pan 6 and the rear floor pan 7.

Meanwhile, as illustrated in FIG. 1, a partial tunnel portion 9 that protrudes into the vehicle interior is formed in the center of the front portion of the floor panel 1 in the vehicle width direction. The tunnel portion 9 is a partial portion only formed between the rear end of the lower portion of the dash panel and a portion immediately before the front-portion cross member 3.

As illustrated in the same figure, a floor frame 10 (in detail, a floor frame upper portion) is fixed to the intermediate portion between the tunnel portion 9 and the side sill 2 in the vehicle width direction by joining. The floor frame 10 has a hat cross-sectional shape, and a closed cross-section portion extending in the vehicle front-rear direction is formed between the floor frame 10 and each of the floor panel 1 and the lower portion of the dash panel by joining a lower flange of the floor frame 10 across the floor panel 1 and the lower portion of the dash panel.

As illustrated in FIG. 1, a bracket 11 provided to protrude that is substantially M-shaped in front view of the vehicle is fixed so as to protrude in an intermediate portion between the front-portion cross member 3 and the intermediate cross member 4 in the front-rear direction and in a central position in the vehicle width direction.

As illustrated in FIG. 1, a kick-up portion reinforcement member 12 having an upper wall, left and right side walls, and a front wall is provided on a central portion immediately before the kick-up portion 5 in the vehicle width direction, and is formed so as to reinforce the kick-up portion 5 by joining a lower flange of the kick-up portion reinforcement member 12 to the floor panel 1 and the kick-up portion 5.

As illustrated in FIG. 1, front pillar portions 13 each having a closed cross-section structure that are located on portions on both of left and right sides of a front windshield (so-called front window glass) in the vehicle width direction and extend in a forwardly descending form are provided.

Hinge pillar portions 16 each having a closed cross-section structure that extend downward from the front end portions of the pair of left and right front pillar portions 13, 13 to support the door hinge members are provided. Each of the hinge pillar portions 16 is a vehicle body strength member extending in the vehicle up-down direction obtained by fixing a hinge pillar inner portion 19 horizontally divided into a hinge pillar upper-inner portion 17 and a hinge pillar lower-inner portion 18, and a hinge pillar outer portion 20 to each other by joining. A hinge pillar closed cross-section portion extending in the vehicle up-down direction is formed between the hinge pillar inner portion 19 and the hinge pillar outer portion 20. The hinge pillar portion 16 is a strength member that couples a front end of the side sill 2 and an inclined lower end portion of the front pillar portion 13 to each other in the up-down direction.

As illustrated in FIG. 1, a pair of left and right roof side rails 21, 21 is provided. The pair of left and right roof side rails 21, 21 is continuous from the front pillar portions 13 to the vehicle rear side, extends in the vehicle front-rear direction in a state closer to being horizontal than the front pillar portions 13, and is joined to a roof panel. In other words, the roof side rails 21 are vehicle body strength members extending along the vehicle front-rear direction on both of left and right sides of the upper portion of the vehicle body in the vehicle width direction, and the roof side rails 21 are each formed to have a closed cross-section structure.

As illustrated in the same figure, rear pillar portions 24 each having a closed cross-section structure that are continuous from the roof side rail 21 to the vehicle rear side and extend to the rear side while curving in a front-high rear-low shape are provided.

As illustrated in FIG. 1, a front header 25 that extends in the vehicle width direction between front end portions of the roof side rails 21 and has both of left and right end portions thereof fixed to the roof side rails 21 is provided.

As illustrated in FIG. 1, a rear header 26 that extends in the vehicle width direction between upper end portions of the rear pillar portions 24 and has both of left and right end portions thereof fixed to the rear pillar portions 24 are provided.

As illustrated in FIG. 1, a plurality of roof reinforcements 27, 28, 29, and 30 spaced apart from each other in the vehicle front-rear direction are provided between the front header 25 and the rear header 26. Those roof reinforcements 27 to 30 extend in the vehicle width direction between the pair of left and right roof side rails 21, 21, and each have both of left and right end portions thereof fixed to the roof side rails 21. Those roof reinforcements 27 to 30 are reinforcements each having a width (front-rear width) in the vehicle front-rear direction and bridging the pair of left and right roof side rails 21, 21 in the vehicle width direction.

Incidentally, as illustrated in FIG. 1, rear side frames 31 each having a closed cross-section structure that extend in the vehicle front-rear direction are provided on both sides of the rear floor pan 7 in the vehicle width direction, and front end portions of the rear side frames 31 are disposed so as to extend frontward to positions that overlap with rear end portions of the side sills 2.

A side panel inner portion 32 and a rear wheel well 33 are provided on the outer side of each of the rear side frames 31 in the vehicle width direction, and a gusset member 34 that couples a damper support portion on the upper end portion of the rear wheel well 33 and the rear pillar portion 24 in the vehicle front-rear direction in a substantially horizontal form is provided.

As illustrated in FIG. 1, a brace member 35 is provided so as to be continuous from an end portion of the rear cross member 8 in the vehicle width direction to the upper side of the vehicle. The brace member 35 is fixed to the inner surface of the rear wheel well 33 and the side panel inner portion 32 by joining, and a closed cross-section portion extending in the vehicle up-down direction is formed between the brace member 35 and each of the side panel inner portion 32 and the rear wheel well 33.

As illustrated in FIG. 1, structure bodies 36 each having a closed cross-sectional shape are provided. Each of the structure bodies 36 couples the rear portion of the roof side rail 21 corresponding to the roof reinforcement 30 located on the rearmost side of the vehicle out of the plurality of roof reinforcements 27 to 30 and the rear end portion of the side sill 2 below the rear portion in a substantially up-down direction of the vehicle. The structure body 36 also serves as a rear-side hinge pillar.

As illustrated in FIG. 1 and FIG. 2, an annular structure body LS that is annularly continuous in side view of the vehicle is formed by the roof side rail 21 that forms an upper wall portion having a closed cross-section structure, the front pillar portion 13 that forms an oblique side portion having a closed cross-section structure, the hinge pillar portion 16 that forms a front wall portion having a closed cross-section structure, the side sill 2 that forms a lower wall portion having a closed cross-section structure, and the structure body 36 that forms a rear wall portion having a closed cross-section structure. A door opening portion 37 without a center pillar is formed on the side portion of the vehicle by those elements 21, 13, 16, 2, and 36. The door opening portion 37 is opened and closed as a front door and a rear door of a suicide door structure, for example. The front end of the front door of the suicide door structure is attached to the hinge pillar portion 16 via a door hinge member so as to be openable and closable, and the rear end of the rear door is attached to the structure body 36 via a door hinge member so as to be openable and closable.

The structure body 36 is a vehicle body strength member extending in a substantially up-down direction of the vehicle on the rear portion of the door opening portion 37, and a front end pivotably supporting portion 40 of a trailing arm 39 in a torsion beam type rear suspension 38 serving as a rear suspension member of the vehicle is provided near the lower end portion of the structure body 36. The front end pivotably supporting portion 40 is attached to an outer-side portion of the rear side frame 31 in the vehicle width direction via a support bracket.

As illustrated in FIG. 1 and FIG. 2, an opening of an opening portion 41 for disposing a quarter window is formed in the rear side of the upper portion of the structure body 36. Substantially the entire side surface of the vehicle body including the abovementioned elements, that is, the structure body 36, the roof side rail 21, the rear pillar portion 24, the side panel inner portion 32, and the side sills 2 is covered with a body side outer panel 42 serving as a vehicle body outer plate except for the opening portion 41 and the door opening portion 37.

As illustrated in FIG. 3 and FIG. 4, the front pillar portion 13 is a vehicle body strength member having a closed cross-section portion 43 along a longitudinal direction X of the front pillar portion 13 obtained by joining a front pillar outer portion 14 and a front pillar inner portion 15 to each other.

As illustrated in FIG. 4, the front pillar outer portion 14 is obtained by integrally forming an upper-side flange 14a, an upper wall 14b, an upper-portion side wall 14c, a coupling wall 14d, a lower-portion side wall 14e, a lower wall 14f, and a lower-side flange 14g, and the front pillar inner portion 15 is obtained by integrally forming an upper-side flange 15a, a side wall 15b, a lower wall 15c, and a lower-side flange 15d.

An inclined lower end side of the front pillar portion 13 is formed so as to overlap with the upper end side of the hinge pillar portion 16.

As illustrated in FIG. 3, a width W1 in the direction orthogonal to the longitudinal direction X (in detail, the area of the cross section orthogonal to the longitudinal direction X) of the front pillar portion 13 is formed to be smaller than a width W2 orthogonal to a longitudinal direction (that is, the up-down direction) Y of the hinge pillar portion 16 (in detail, the area of the cross section orthogonal to the longitudinal direction Y). In other words, a relational expression of W1<W2 is satisfied.

As illustrated in FIG. 2 and FIG. 3, a bent portion 44 is formed between the upper end portion of the hinge pillar portion 16 and the inclined lower end portion of the front pillar portion 13, and a plate-like member 50 serving as a reinforcement portion that covers a position at which the curvature of the edge on the door opening portion 37 side is the maximum (a position at which the radius of curvature is the minimum) is provided in a cross section orthogonal to the longitudinal direction of the bent portion 44, that is, a closed cross-section portion (a section corresponding to the bent portion 44 out of the closed cross-section portion 43) orthogonal to the longitudinal direction. The crushing of the closed cross-section portion of the front pillar portion 13 and the hinge pillar portion 16 is suppressed by the plate-like member 50.

As a result, when external force is applied to the front pillar portion 13 in the direction of bending the front pillar portion 13 in the bending direction thereof, the crushing of the closed cross-section portion 43 is suppressed by the plate-like member 50 serving as a reinforcement portion and the bending deformation of the front pillar portion 13 with respect to the hinge pillar portion 16 is suppressed.

As illustrated in FIG. 4, FIG. 5, and FIG. 6, the plate-like member 50 is obtained by integrally forming a member main body 50a, a bead portion 50b provided on an intermediate portion of the member main body 50a in the front-rear direction so as to inwardly protrude in the vehicle width direction, an upper-side orthogonal flange 50c inwardly extending in the vehicle width direction from an upper end of the member main body 50a, a lower-side orthogonal flange 50d inwardly extending in the vehicle width direction from a lower end of the member main body 50a, a front-side longitudinal flange 50e inwardly extending in the vehicle width direction from a front end of the member main body 50a, and a rear-side longitudinal flange 50f inwardly extending in the vehicle width direction from a rear end of the member main body 50a. The plate-like member 50 can be formed by pressing metal.

The bead portion 50b is formed along an orthogonal direction Z substantially orthogonal to a longitudinal direction Xa of the closed cross-section portion 43 in which the plate-like member 50 is provided, to thereby reinforce the proof stress of the plate-like member 50 in the orthogonal direction Z and further suppress the crushing of the closed cross-section portion 43. The bead portion 50b is formed in a front-high rear-low shape in which the vehicle front side thereof is high and the vehicle rear side thereof is low. Note that only a single bead portion 50b is formed in this embodiment, but a structure in which a plurality of bead portions are formed along the orthogonal direction Z may also be employed.

The upper-side orthogonal flange 50c and the lower-side orthogonal flange 50d are formed along the orthogonal direction Z substantially orthogonal to the longitudinal direction Xa of the closed cross-section portion 43 in which the plate-like member 50 is provided, to thereby reinforce the proof stress of the plate-like member 50 in the orthogonal direction Z and further suppress the crushing of the closed cross-section portion 43.

The front-side longitudinal flange 50e and the rear-side longitudinal flange 50f are formed along the longitudinal direction Xa of the closed cross-section portion 43 in which the plate-like member 50 is provided, to thereby reinforce the proof stress of the plate-like member 50 in the direction along the longitudinal direction Xa and suppress the crushing of the closed cross-section portion 43 even more. By the flanges 50c, 50d, 50e, and 50f, the proof stress of the vehicle with respect to the vehicle width direction is also increased, and strength against the crush deformation is increased.

As illustrated in FIG. 5, on the lower end portion and the upper end portion of the front-side longitudinal flange 50e in the plate-like member 50, protruding portions 50g and 50h are integrally formed with the flange 50e. As illustrated in FIG. 3, the protruding portions 50g and 50h are fixed to the upper wall 14b of the front pillar outer portion 14 by joining by joining means such as spot welding, and the lower portion and the upper portion of the rear-side longitudinal flange 50f in the plate-like member 50 are fixed to the lower wall 14f of the front pillar outer portion 14 by joining by joining means such as spot welding.

Note that, in the drawings, arrow F indicates the vehicle front side, arrow R indicates the vehicle rear side, arrow IN indicates the inner side in the vehicle width direction, arrow OUT indicates the outer side in the vehicle width direction, and arrow UP indicates the vehicle upper side.

As described above, the upper vehicle-body structure of the abovementioned embodiment includes: the front pillar portions 13 each having a closed cross-section structure, the front pillar portions 13 being located on both of left and right sides of the front windshield in the vehicle width direction; and the hinge pillar portions 16 each having a closed cross-section structure, the hinge pillar portions 16 extending downward from front end portions of the front pillar portion 13 to support door hinge members, the area of the cross section orthogonal to the longitudinal direction X of each of the front pillar portions 13 is smaller than the area of the cross section orthogonal to the longitudinal direction Y of each of the hinge pillar portions 16, and the reinforcement portion (see the plate-like member 50) that suppresses the crushing of the closed cross-section portion 43 formed by the front pillar portion 13 and the hinge pillar portion 16 is provided (see FIG. 1, FIG. 3, and FIG. 4) so as to cover the position at which the curvature of the edge on the door opening portion 37 side in the cross section orthogonal to the longitudinal direction (see the closed cross-section portion 43) of the bent portion 44 between the front pillar portion 13 and the hinge pillar portion 16 is maximum.

With this configuration, the reinforcement portion (plate-like member 50) that suppresses the crushing of the closed cross-section portion 43 between the front pillar portion 13 and the hinge pillar portion 16 is provided so as to cover the position at which the curvature is the maximum (that is, the position at which the radius of curvature is the smallest and which becomes the starting point of the bending deformation). Therefore, when external force is applied to the front pillar portion 13 in a direction of bending the front pillar portion 13 in the bending direction thereof, the crushing of the closed cross-section portion 43 can be suppressed by the reinforcement portion (plate-like member 50) and the bending deformation of the front pillar portion 13 with respect to the hinge pillar portion 16 can be suppressed. By locally reinforcing the position that becomes the starting point of the bending deformation, the suppression of the bending deformation can be realized with a lightweight configuration.

The area of the cross section orthogonal to the longitudinal direction X of the front pillar portion 13 is smaller than the area of the cross section orthogonal to the longitudinal direction Y of the hinge pillar portion 16, and hence visibility can be improved (frontal vision can be improved) and the vehicle design properties can be improved.

In one embodiment of the present disclosure, the reinforcement portion is the plate-like member 50, and the plate-like member 50 has the bead portion 50b formed substantially orthogonal to the longitudinal direction Xa of the closed cross-section portion 43 in which the plate-like member 50 is provided (see FIG. 3 to FIG. 5).

With this configuration, by forming the bead portion 50b, the proof stress in the plate-like member 50 (reinforcement portion) in the direction Z substantially orthogonal to the longitudinal direction Xa of the closed cross-section portion 43 is reinforced, and hence the crushing of the closed cross-section portion 43 can be further suppressed and the bending deformation of the front pillar portion 13 can be suppressed even more.

In one embodiment of the present disclosure, the reinforcement portion is the plate-like member 50, and the plate-like member 50 has flange portions (the upper-side orthogonal flange 50c and the lower-side orthogonal flange 50d) formed substantially orthogonal to the longitudinal direction Xa of the closed cross-section portion 43 in which the plate-like member 50 is provided (see FIG. 3 to FIG. 5).

With this configuration, by forming the flange portions (the upper-side orthogonal flange 50c and the lower-side orthogonal flange 50d), the proof stress in the plate-like member 50 (reinforcement portion) in the direction Z substantially orthogonal to the longitudinal direction Xa of the closed cross-section portion 43 is reinforced, and hence the crushing of the closed cross-section portion 43 can be further suppressed and the bending deformation of the front pillar portion 13 can be suppressed even more.

In one embodiment of the present disclosure, the reinforcement portion is the plate-like member 50, and the plate-like member 50 has flange portions (the front-side longitudinal flange 50e and the rear-side longitudinal flange 50f) formed along the longitudinal direction Xa of the closed cross-section portion 43 in which the plate-like member 50 is provided (see FIG. 3 to FIG. 5).

With this configuration, by forming the flange portions (the front-side longitudinal flange 50e and the rear-side longitudinal flange 50f), the proof stress in the plate-like member 50 (reinforcement portion) in the direction along the longitudinal direction Xa of the closed cross-section portion 43 is reinforced, and hence the crushing of the closed cross-section portion 43 can be further suppressed and the bending deformation of the front pillar portion 13 can be suppressed even more.

Regarding the correspondence between the configuration of the present disclosure and the abovementioned embodiment, the reinforcement portion of the present disclosure corresponds to the plate-like member 50 of this embodiment. Similarly, the flange portion substantially orthogonal to the longitudinal direction corresponds to the upper-side orthogonal flange 50c and the lower-side orthogonal flange 50d, and the flange portion along the longitudinal direction corresponds to the front-side longitudinal flange 50e and the rear-side longitudinal flange 50f. However, the present disclosure is not only limited to the configurations of the abovementioned embodiment.

For example, in the abovementioned embodiment, only a single bead portion 50b is formed on the plate-like member 50, but a structure in which a plurality of bead portions are integrally formed along the orthogonal direction Z so as to be substantially orthogonal to the longitudinal direction Xa of the closed cross-section portion 43 may be employed.

As described above, the present disclosure is useful for an upper vehicle-body structure including front pillar portions each having a closed cross-section structure, the front pillar portions being located on both of left and right sides of a front windshield in the vehicle width direction, and hinge pillar portions each having a closed cross-section structure, the hinge pillar portions extending downward from front end portions of the front pillar portions to support door hinge members.

What is claimed is:

1. An upper vehicle-body structure, comprising:
   front pillar portions each having a closed cross-section structure, the front pillar portions being located on both of left and right sides of a front windshield in a vehicle width direction; and
   hinge pillar portions each having a closed cross-section structure, the hinge pillar portions extending downward from front end portions of the front pillar portions to support door hinge members, wherein:
   an area of a cross section orthogonal to a longitudinal direction of each of the front pillar portions is smaller than an area of a cross section orthogonal to a longitudinal direction of each of the hinge pillar portions; and
   a reinforcement portion that suppresses crushing of a closed cross-section portion formed by the front pillar portion and the hinge pillar portion is provided so as to reinforce a position at which a curvature of an edge on a door opening portion side in a cross section orthogonal to a longitudinal direction of a bent portion between the front pillar portion and the hinge pillar portion is maximum,
   wherein the reinforcement portion is a plate-like member, the plate-like member including
      a bead portion formed substantially orthogonal to a longitudinal direction of the closed cross-section portion in which the plate-like member is provided,
      a flange portion formed along a longitudinal direction of the closed cross-section portion in which the plate-like member is provided, the flange portion including a front-side longitudinal flange portion formed along the longitudinal direction of the closed cross-section portion in which the plate-like member is provided, wherein the front-side longitudinal flange portion extends in the vehicle width direction, and
      protruding portions integrally formed with the front-side longitudinal flange portion and fixed to the upper wall of an outer portion of the front pillar portion, wherein one protruding portion of the protruding portions is located at a front side of the longitudinal direction from the bead portion, and another protruding portion of the protruding portions is located at a rear side of the longitudinal direction of the bead portion.

2. The upper vehicle-body structure according to claim 1, wherein:
   the plate-like member has a flange portion formed substantially orthogonal to a longitudinal direction of the closed cross-section portion in which the plate-like member is provided.

3. The upper vehicle-body structure according to claim 1, wherein:
   the plate-like member has a rear-side longitudinal flange portion formed along a longitudinal direction of the closed cross-section portion in which the plate-like member is provided.

4. The upper vehicle-body structure according to claim 2, wherein:
   the plate-like member has a rear-side longitudinal flange portion formed along a longitudinal direction of the closed cross-section portion in which the plate-like member is provided.

5. The upper vehicle-body structure according to claim 2, wherein:
   the flange portion is an upper-side orthogonal flange or a lower-side orthogonal flange.

6. The upper vehicle-body structure according to claim 1, wherein:
   the flange portion includes a front-side longitudinal flange and a rear-side longitudinal flange.

7. The upper vehicle-body structure according to claim 1, wherein a depth direction of the bead portion is substantially the same as an extending direction of the front-side longitudinal flange.

8. The upper vehicle-body structure according to claim 7, wherein an extending length in the vehicle width direction of the front-side longitudinal flange portion is shortest in the longitudinal direction where the front-side longitudinal flange portion overlaps with the bead portion.

9. The upper vehicle-body structure according to claim 1, wherein the bead portion is located at the position at which the curvature of the edge on the door opening portion side in the cross section orthogonal to the longitudinal direction of the bent portion is maximum.

10. An upper vehicle-body structure, comprising:
    front pillar portions each having a closed cross-section structure, the front pillar portions being located on both of left and right sides of a front windshield in a vehicle width direction; and
    hinge pillar portions each having a closed cross-section structure, the hinge pillar portions extending downward from front end portions of the front pillar portions to support door hinge members, wherein:
    an area of a cross section orthogonal to a longitudinal direction of each of the front pillar portions is smaller than an area of a cross section orthogonal to a longitudinal direction of each of the hinge pillar portions; and
    a reinforcement portion that suppresses crushing of a closed cross-section portion formed by the front pillar portion and the hinge pillar portion is provided so as to reinforce a position at which a curvature of an edge on a door opening portion side in a cross section orthogonal to a longitudinal direction of a bent portion between the front pillar portion and the hinge pillar portion is maximum,
    wherein the reinforcement portion is a plate-like member, the plate-like member including a bead portion formed substantially orthogonal to a longitudinal direction of the closed cross-section portion in which the plate-like member is provided,
    wherein the bead portion is located at the position at which the curvature of the edge on the door opening portion side in the cross section orthogonal to the longitudinal direction of the bent portion is maximum.

11. The upper vehicle-body structure according to claim 10, wherein:
    the plate-like member has a flange portion formed substantially orthogonal to a longitudinal direction of the closed cross-section portion in which the plate-like member is provided.

12. The upper vehicle-body structure according to claim 10, wherein:

the plate-like member has a flange portion formed along a longitudinal direction of the closed cross-section portion in which the plate-like member is provided.

13. The upper vehicle-body structure according to claim 11, wherein:
the plate-like member has a flange portion formed along a longitudinal direction of the closed cross-section portion in which the plate-like member is provided.

14. The upper vehicle-body structure according to claim 11, wherein:
the flange portion is an upper-side orthogonal flange or a lower-side orthogonal flange.

15. The upper vehicle-body structure according to claim 11, wherein:
the flange portion includes a front-side longitudinal flange and a rear-side longitudinal flange.

16. The upper vehicle-body structure according to claim 13, wherein:
the flange portion includes a front-side longitudinal flange portion formed along the longitudinal direction of the closed cross-section portion in which the plate-like member is provided.

17. The upper vehicle-body structure according to claim 16, wherein:
the front-side longitudinal flange portion includes protruding portions integrally formed with the front-side longitudinal flange portion and fixed to the upper wall of an outer portion of the front pillar portion.

* * * * *